Patented Jan. 11, 1938

2,105,321

UNITED STATES PATENT OFFICE 2,105,321

HYDROGENATION OF ALPHA-NITRONAPHTHALENE

Clyde O. Henke, Wilmington, Del., and Roland George Benner, Carneys Point, N. J., assignors to E. I. du Pont de Nemours & Company, Wilmington, Del., a corporation of Delaware No Drawing. Application October 19, 1935, Serial No. 45,826

11 Claims. (Cl. 260—130.5)

This invention relates to a process for the manufacture of alpha naphthylamine and more particularly to a process for its manufacture by liquid phase hydrogenation of alpha nitronaphthalene.

In the British Patent 227,481 (1924) to Poma and Pelligrini a catalytic hydrogenation of nitronaphthalene to alpha naphthylamine is disclosed. In this process the reaction is carried out at 50 to 60° C. under a pressure of a fraction of an atmosphere to 4 to 5 atmospheres in the presence of a nickel catalyst. The nitrocompound is mixed with a large amount of water. A quantity of water equal to 2 to 5 times the weight of the nitronaphthalene is specified.

This invention has as an object an improved process for the production of alpha naphthylamine. A further object is to produce alpha naphthylamine by liquid phase hydrogenation of alpha nitronaphthalene in the presence of a nickel catalyst with a maximum yield and under practical operating conditions.

These objects are accomplished by the following invention which comprises catalytically hydrogenating nitronaphthalene to alpha naphthylamine at 70 to 130° C. and at hydrogen pressures above 350 pounds per sq. in. The nitrocompound may contain or be mixed with a small amount of water, to which may be added small amounts of an alkaline substance such as sodium acetate to promote a more uniform reaction.

Alpha nitronaphthalene is reduced to alpha naphthylamine in the liquid phase with hydrogen. The hydrogenation is preferably carried out at 80 to 100° C. and under 400 to 500 pounds hydrogen pressure in the presence of a nickel catalyst. After hydrogen absorption has ceased, the charge is filtered to remove catalyst, and the alpha naphthylamine is separated from the water layer. The amine thus produced may be further purified by vacuum distillation through a short column. The distilled amine in this liquid state is a colorless product which analyzes 99 to 100% naphthylamine.

The following examples illustrate the invention:

Example I

To 100 parts nitronaphthalene (M. P. about 51° C.) and 2 parts nickel catalyst (containing 25% reduced nickel) in an autoclave equipped for rapid agitation, are added 5 parts water containing 0.12 part sodium acetate. The autoclave is closed, and the nitronaphthalene is reduced at 80 to 100° C. under 400 to 500 pounds hydrogen pressure. When hydrogen absorption has ceased, the remaining pressure is released and the mass is filtered. The filtrate contains crude alpha naphthylamine and water which is separated from the amine. The crude amine can be further purified by vacuum distillation through a short column. The distilled product in the liquid state is colorless, and analyzes 99 to 100% naphthylamine on the NH₂ basis and is obtained in excess of 90% of the theoretical yield based on the nitronaphthalene.

Example II 100 parts of nitronaphthalene, obtained by nitrating naphthalene which has been purified in accordance with U. S. Patent 1,763,410, is hydrogenated in the presence of 0.75 part nickel catalyst (containing 25% reduced nickel) with the same amounts of water and sodium acetate and under the same conditions as in Example I. The distilled product in the liquid state is colorless, and analyzes 99 to 100% naphthylamine on the NH₂ basis and is obtained in excess of 90% of the theoretical yield based on the nitronaphthalene. The time of reduction in this example is about the same as in Example I, but less than 40% as much catalyst is required than in Example I. A smaller amount of catalyst can be used in both Examples I and II, but the rate of hydrogenation is proportionately decreased.

This invention is not limited to the proportions of the various materials given in the preceding examples nor to the specific temperatures or pressures used in those examples. Temperatures of 70 to 130° C. and hydrogen pressures of 350 lbs. to 2000 lbs. per sq. in. and higher may be used. At lower temperatures (50 to 60° C.), however, the reaction becomes too slow, whereas, at lower pressures (below 350 pounds) and at temperatures of 80 to 90° C., high distillation residues are formed, resulting in yields of naphthylamine as low as 70%. The speed of the reaction is increased at the higher temperatures and pressures, but much better yields are obtained with low temperatures (75 to 110° C.) and high pressures, (above 450 lbs.). Higher temperatures than herein described promote the formation of non-distillable residues and result in substantially lower yields of alpha naphthylamine. High pressures are advantageous but the advantages become small above 500 lbs. Water may be used in amounts from traces up to that amount equal in weight to the nitronaphthalene. Still larger amounts of water, however, (such as three times the weight of the nitrobody)

considerably reduce the rate of hydrogenation. Smaller amounts of water may be used if desired, or nitronaphthalene containing water as obtained by decantation of water from nitronaphthalene may be used without a further addition of water. Small traces of water are sufficient to start the reaction and appear to be essential for a rapid initial hydrogenation. As the reaction proceeds water is formed and the rate of hydrogen absorption increases. The amount of catalyst used can be varied considerably. In Example I the amount of reduced nickel in the catalyst is equal to 0.5% of the nitronaphthalene. In Example II the amount of reduced nickel in the catalyst is equal to about 0.2% of the nitronaphthalene. When the active nickel in the catalyst becomes more than 2% of the nitronaphthalene the amount becomes excessive and difficulties of removal, separation and handling appear. Active nickel containing catalysts known to the art, whether supported or not, may be used.

Although not essential, the presence of an alkaline substance is highly desirable in that hydrogenation is more rapid and goes to completion more uniformly. The alkaline substance should be at least slightly soluble in water and should be used in amounts not exceeding 3% of the weight of the nitronaphthalene. Besides sodium acetate, free bases and other salts of weak acids and strong bases, which react alkaline can be used.

As many apparently widely different embodiments of this invention may be made without departing from the spirit and scope thereof, it is to be understood that we do not limit ourselves to the specific embodiments thereof except as defined in the appended patent claims.

We claim:

1. The process for the production of alpha naphthylamine, which comprises reacting with hydrogen alpha nitronaphthalene containing less than an equal weight of water, in the liquid phase at a temperature within the range of 70° to 130° C. and at a pressure in excess of 350 lbs. per square inch, in the presence of an active nickel catalyst in which the active nickel is less than 2% by weight of the nitro body.

2. The process in accordance with claim 1 characterized in that the water is present in an amount equivalent to about 5% by weight of the nitro compound.

3. The process for the production of alpha naphthylamine, which comprises reacting in the liquid phase alpha nitro naphthalene with hydrogen at a temperature within the range of 75 to 110° C. and a pressure in excess of 350 lbs. per sq. in., in the presence of a nickel catalyst in which the active nickel is less than 2% by weight of the nitro compound and in the presence of an amount of water varying from a trace to an amount equal to the weight of the nitronaphthalene.

4. The process in accordance with claim 3 characterized in that the water is present in an amount equivalent to about 5% by weight of the nitro compound.

5. The process for the production of alpha naphthylamine, which comprises reacting in the liquid phase alpha nitro naphthalene with hydrogen at a temperature within the range of 70 to 130° C. and at a pressure in excess of 350 lbs. per sq. in., in the presence of a nickel catalyst in which the active nickel is less than 2% by weight of the nitro compound and in the presence of an amount of water varying from a trace to an amount equal to the weight of the nitronaphthalene and an alkaline substance in an amount less than 3% by weight of the nitro compound.

6. The process in accordance with claim 5 characterized in that the alkaline substance is sodium acetate.

7. The process in accordance with claim 5 characterized in that the alkaline substance is sodium acetate and present in an amount equivalent to about 0.12% by weight of the nitro compound.

8. The process for the production of alpha naphthylamine, which comprises reacting in the liquid phase alpha nitro naphthalene with hydrogen at a temperature within the range of 75 to 110° C. and at a pressure in excess of 350 lbs. per sq. in., in the presence of a nickel catalyst in which the active nickel is less than 2% by weight of the nitro compound and in the presence of an amount of water varying from a trace to an amount equal to the weight of the nitronaphthalene and an alkaline substance in an amount less than 3% by weight of the nitro compound.

9. The process in accordance with claim 8 characterized in that the alkaline substance is sodium acetate.

10. The process in accordance with claim 8 characterized in that the alkaline substance is sodium acetate and present in an amount equivalent to about 0.12% by weight of the nitro compound.

11. The process for the production of alpha naphthylamine, which comprises reacting in the liquid phase alpha nitro naphthalene with hydrogen at a temperature of about 80° to about 100° C. and at a pressure of about 400 to about 500 lbs. per sq. in., in the presence of a nickel catalyst in which the active nickel is about .2% to about .5% by weight of the nitro compound in the presence of water in an amount of about 5% by weight of the nitro compound and in the presence of sodium acetate in the amount of about 0.12% by weight of the nitro compound.

CLYDE O. HENKE.
ROLAND GEORGE BENNER.